United States Patent [19]
Li et al.

[11] Patent Number: 5,788,760
[45] Date of Patent: Aug. 4, 1998

[54] CONTROL OF INTERFACE PROPERTIES BETWEEN FIBER/CEMENTITIOUS MATERIAL USING PLASMA TREATMENT

[75] Inventors: Victor C. Li; Hwai-Chung Wu, both of Ann Arbor, Mich.

[73] Assignee: The Regents of the University of Michigan, Ann Arbor, Mich.

[21] Appl. No.: 606,495

[22] Filed: Mar. 4, 1996

[51] Int. Cl.[6] .................................................. C04B 16/06
[52] U.S. Cl. .......................... 106/644; 106/711; 106/724; 106/823; 428/378; 428/703; 428/902
[58] Field of Search ............................. 106/644, 724, 106/711, 802, 823; 428/378, 694 TZ, 703, 902

[56] References Cited

U.S. PATENT DOCUMENTS

| | | | |
|---|---|---|---|
| 4,410,586 | 10/1983 | Ladizesky et al. | 428/245 |
| 5,001,008 | 3/1991 | Tokita et al. | 428/400 |
| 5,391,226 | 2/1995 | Frankowski | 106/696 |

FOREIGN PATENT DOCUMENTS

| | | |
|---|---|---|
| 0 080 099 A2 | 6/1983 | European Pat. Off. . |
| 0 117 561 A2 | 9/1984 | European Pat. Off. . |
| WO 95/12697 | 3/1993 | WIPO . |

*Primary Examiner*—Paul Marcantoni
*Attorney, Agent, or Firm*—Harness, Dickey & Pierce, P.L.C.

[57] ABSTRACT

The present invention relates to processes for enhancing the bond strength of a cement matrix including reinforcement fibers and for modifying the surface characteristics of reinforcement fibers useful in cementitious materials. The processes further relate to controlling the interface properties and, more particularly, the bond strength ($\tau$) and interface toughness ($T_i$), between synthetic fibers and a cementitious material forming a matrix. By plasma treating synthetic fibers with an excitable gas capable of displacing hydrogen atoms occurring along said reinforcement fibers, the bond strength and interface toughness of the composite is dramatically increased over composites employing non-plasma treated fibers.

12 Claims, 4 Drawing Sheets

(a)

(b)

Contact angle measurement (a) untreated PE film (b) air plasma treated PE film with 300 watt for 1 minute.

CONTROL OF INTERFACE PROPERTIES BETWEEN FIBER/CEMENTITIOUS MATERIAL USING PLASMA TREATMENT

BACKGROUND OF THE INVENTION

The present invention relates to engineered cementitious composites and, more particularly, to the treatment of fibrous materials employed in such materials to enhance the interfacial properties of the composite materials. It should be noted from the outset that research for the present invention was supported in part by the National Science Foundation under contract number MSS-9301949, effective Jun. 15, 1993, through May 31, 1996.

High strength concretes have been developed and used in the construction of various buildings, however, the brittle nature of most known high strength concretes hinders widespread acceptance in the construction industry. To address the concern regarding the brittleness of high strength concretes, fiber reinforcements have been employed in an attempt to improve the toughness of a concrete matrix. Insufficient bond properties often result between many known fibers and cements, however, which in turn lead to little or no improvement in strength or ductility, unless a very high dosage of fibers is used (i.e. greater than 10 volume percent). A high concentration of fibers in the cement matrix is generally considered to be undesirable in that it greatly increases material cost and is difficult to process using conventional equipment.

SUMMARY OF THE INVENTION

Advances in micromechanics modeling of fiber reinforced cement based composites have lead the inventors to create ductile cement composites, otherwise referred to herein as engineered cementitious composites, incorporating plasma treated fibers. Engineered cementitious composites have a strain capacity of approximately two order of magnitude higher and a toughness of approximately three order of magnitude higher than that of normal concrete by including up to five volume percent, and more preferably, approximately two volume percent of plasma treated fibrous material within the composite, based on the total volume of the composite.

A minimum fiber quantity, expressed herein as the critical fiber volume fraction ($V_f^{crit}$), is found essential to ensuring transition from a brittle to a ductile material. $V_f^{crit}$ is strongly dependent on interface properties ($\tau$ and $T_i$) and fiber aspect ratio ($L_f/d_f$ ratio of fiber length to fiber diameter). The latter $L_f/d_f$ in turn, is bound by a lower limit, $(L_f/d_f)_{limit}$, with $\tau$ in the denominator. Thus, the critical fiber volume fraction can be expressed in terms of fiber, matrix and interface parameters by the following formula (I):

$$V_f^{crit} = \frac{12 J_c}{g\tau(L_f/d_f)\delta_o}$$

where $J_c$ is the composite crack tip toughness and is approximately equal to the cementitious matrix toughness for low fiber volume, and $L_f$ and $d_f$ are fiber length and diameter, respectively. The snubbing factor g and interface frictional bond strength $\tau$ are the parameters which describe the interaction between fibers and cementitious material. The snubbing factor can be interpreted physically as the increase in bridging force across a matrix crack when a fiber is pulled out at an inclined angle (analogous to a flexible rope passing over a friction pulley). Finally, $\delta_o$ is the crack opening at which the fiber bridging stress $\sigma_o$, reaches a maximum, as given by the following formula (II):

$$\delta_o = \frac{\tau L_f^2}{E_f d_f (1+\eta)}$$

where $\eta = (V_f E_f)/(V_m E_m)$; $V_f$, $E_f$ are the fiber volume fraction and elastic modulus, respectively, and $V_m$, $E_m$ are the matrix volume fraction and elastic modulus, respectively.

When a brittle matrix shows pseudo strain hardening, the ultimate strength of the composite $\sigma_{cu}$ coincides with the maximum bridging stress $\sigma_o$, given by the formula (III):

$$\sigma_{cu} = \frac{1}{2} g \tau V_f (L_f/d_f)$$

Thus, it is clear from $V_f^{crit}$ that an increase of bond strength $\tau$ will lead directly to a reduction in the amount of fibers needed to create a composite which exhibits pseudo strain hardening. Furthermore, the ultimate strength of such a composite scales linearly with bond strength $\tau$, according to $\sigma_{cu}$.

The ductility of the composite is associated with the inelastic strain generated as a result of multiple cracking. This inelastic strain results from the multiple crack density and from the opening of each crack. The multiple crack density is expected to increase with the bond strength $\tau$, which controls the rate of stress transfer from the bridging fiber into the matrix material. However, the "spring" stiffness of the bridging fibers will also increase, leading to a reduction in crack opening for a given bridging stress. Thus, the composite ductility is expected to increase less than linearly with $\tau$. All of the composite properties discussed above (i.e. the failure mode change from quasi-brittle to ductile, the ultimate strength, and the composite ductility) can, therefore, be modified through control of the interfacial bond strength, while keeping other parameters essentially the same.

A high $\tau$ is, therefore, both critically favorable to significantly reduce $V_f^{crit}$ and $(L_f/d_f)_{limit}$, leading to high performance fiber reinforced concrete which is processable utilizing conventional construction equipment with minimum cost increase.

One objective of the present invention is to control interface properties, and more particularly, the bond strength $\tau$ and interface toughness $T_i$, between fibers and a cement based matrix. It has been found that, with an optimum plasma treatment of fibers, as demonstrated using polyethylene fibers, $\tau$ can be increased by a factor of approximately six and $T_i$ can be increased by as much as approximately seven times, compared to non-plasma treated fibers. While polyethylene fibers have been employed for purposes of demonstrating a working example of the present invention, it should be noted by those skilled in the art that virtually any fibrous reinforcement material capable of surface treatment using plasma techniques as described herein is contemplated as being useful in accordance with the teachings of the present invention.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

Figure 1A:
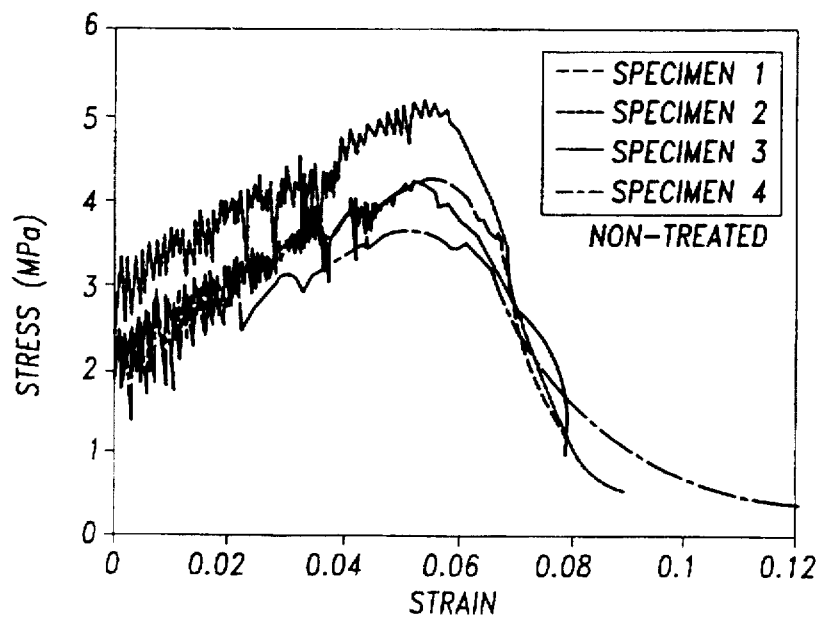
FIGS. 1(a–d) are graphs illustrating the tensile stress/strain curves of various cement paste reinforced with polyethylene fibers.
Figure 1B:
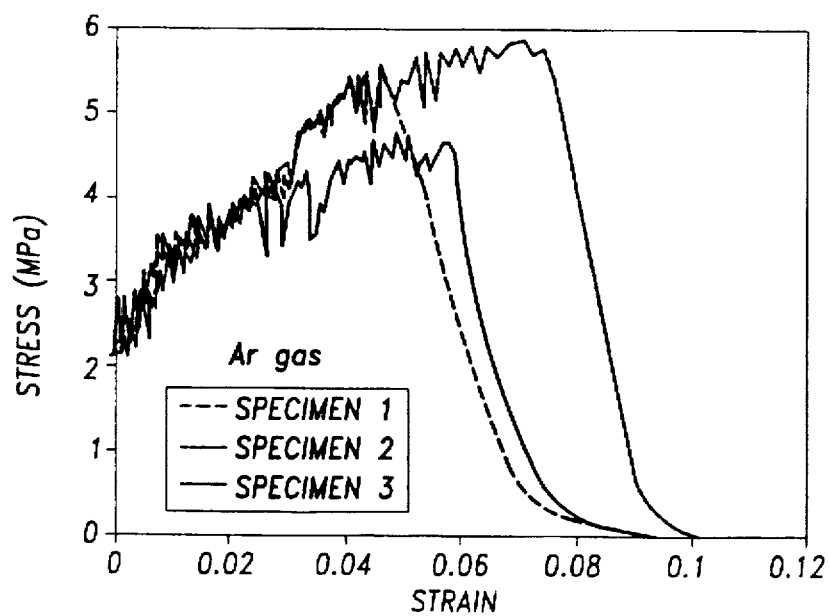
Figure 1C:
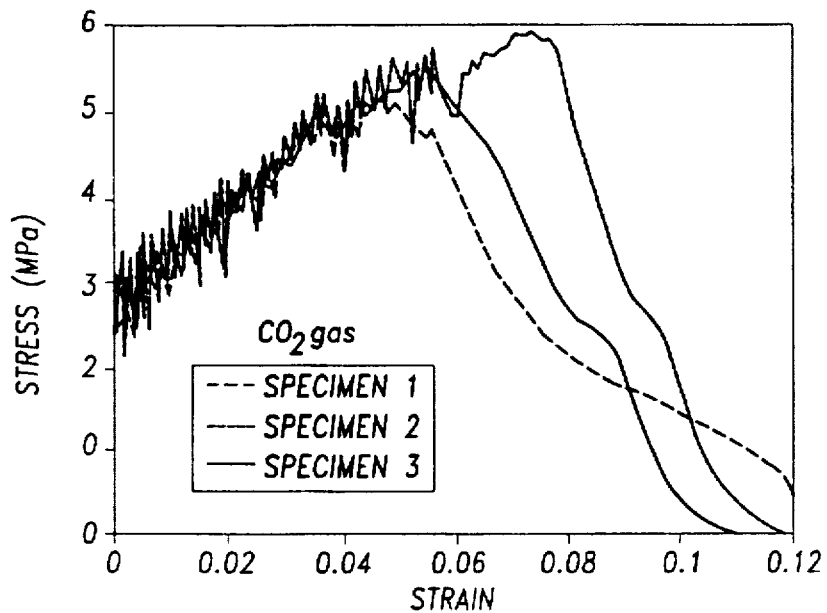
Figure 1D:
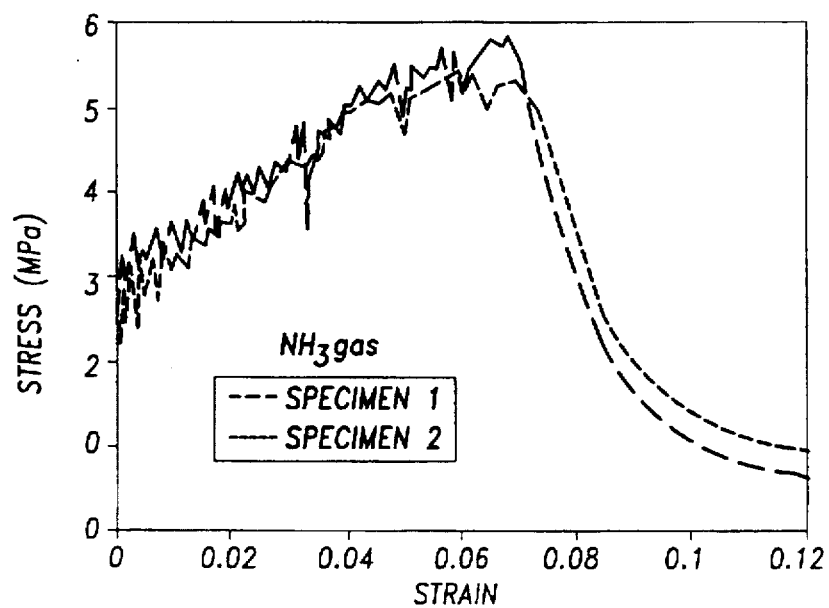

The process according to the present invention consists in treating fibers with plasma such that the interface bond strength between the fibers and cementitious material in a cement matrix is dramatically improved.

In order to improve the interfacial bond strength, the fibrous materials employed in the cement matrix, are initially treated utilizing cold gas plasma techniques to modify the surface chemistry of the fibers. Thus, the main mechanism for surface modification of fibers utilizing cold gas plasma techniques is the removal of hydrogen atoms from the fibers followed by replacement with polar groups. The presence of polar or functional groups on the fiber surface enhances the reactivity with cementitious material, thus promoting excellent adhesion between the fibers and the cementitious material of the cement matrix. Cementitious materials as the term is used herein includes generally cements, mortars and concretes. Since the optimum gas chemistry and operating conditions such as generator power and reactor pressure, among others, can be varied depending on the nature of the fibrous material to be treated, the plasma treatment can be applied to a wide range of fibrous materials including but not limited to polymers as well as a wide range of fibrous types such as continuous, discontinuous and mesh-like fibers. Preferably, the plasma employed will include $O_2$ due to the —OH polar group which forms a hydrogen bond with cementitious products.

In order to demonstrate the working principle of the present invention, two types of specimen were initially prepared. The first type of specimen referred to herein as the "composite specimen" were prepared to study the uniaxial tensile response of the composite. Additionally, direct pull-out specimen were prepared to study interfacial bond properties.

A radio frequency discharge plasma surface treatment system was utilized to create the plasma for treatment of high-modulus polyethylene fibers. To prepare the composite specimen, discontinuous fibers were initially treated in a Harrick PDC 3XG plasma generator. To treat the fibers, three types of gases, namely Ar, $CO_2$ and $NH_3$ were employed at an initial pressure of 480 mtorr and a power level of 58 watts. Fiber treatment time was five minutes and applied at flow rates of 50, 40 and 40 mL/min for Ar, $CO_2$ and $NH_3$, respectively. Subsequently, the treated fibers were mixed with cement paste to form the cementitious matrix.

The composites under investigation consist of Type I portland cement (c), fumed silica (fs), water (w), and both treated and non-treated high-modulus polyethylene fibers. The mix proportions of the composite were 1.0(c):0.2(fs): 0.27(w) by weight, respectively, with 2.0 volume percent of discontinuous fibers mixed in based on a total volume of 100% to form a 3-D random reinforcement. The discontinuous or "short" fibers employed in the composites prepared for the tensile tests generally had the following average parameters: $L_f$=12.7 mm; $d_f$=38.0 μm; $E_f$=120.0 GPa; $V_f$=2.0 vol. %; g=2.0.

While 2.0 vol. % of fibrous material based on the total volume is preferred for a variety of reasons, it is contemplated that the compositions of the present invention may include up to 5.0% by volume and still be capable of processing using conventional techniques.

The direct tensile tests were performed using specimens having average dimensions of 304.8 mm×76.2 mm×12.7 mm. Aluminum plates were glued onto the ends of the specimens to facilitate gripping. To insure complete curing, all specimens were 28 days old at the time of testing. The tensile behavior of composites reinforced with plasma-treated and non-treated polyethylene fibers can be determined from these direct tensile tests. For a further understanding of the preparation techniques employed to conduct the direct tensile tests in accordance with the present invention, reference can be made to an article entitled "Tensile Behavior of Cement Based Composites with Random Discontinuous Steel Fibers," *J. Amer. Ceramics Soc.*, Vol. 79, No. 1, pgs. 74–78 (1996), which is hereby expressly incorporated by reference.

As shown in FIG. 1(a), a pseudo strain-hardening behavior is observed for the composite ultimate strength and strain of 3.6–5.1 MPa and 5.5%, respectively. This behavior is distinctly different from brittle failure of a plain cement matrix, or quasi-brittle failure of ordinary fiber-reinforced cement composites. The plasma-treated fiber composites FIGS. 1(b–d) exhibit even higher composite strength and strain. For Ar-plasma treatment, the composite ultimate strengths for three specimens are between 4.7 and 5.8 MPa. For $CO_2$-plasma treatment, the resulting strengths are from 5.2 to 5.9 MPa. For $NH_3$-plasma gas, the resulting strengths are 5.5 and 5.8 MPa for two specimens as illustrated in Table I below. The strain capacity at ultimate strength increases from 5.5% for the non-treated fiber composite to 5.8%, 5.8%, and 6.75%, for the Ar, $CO_2$, and $NH_3$ plasma treated fiber composites, respectively.

TABLE I

Composite Ultimate Strength and Deduced Bond strength for Various Plasma-Gas Treatments

| Plasma treatment | σ (MPa) | τ (MPa) | Average τ (MPa) |
|---|---|---|---|
| Virgin | 5.1 | 0.76 | 0.63 |
|  | 4.1 | 0.61 |  |
|  | 4.2 | 0.63 |  |
|  | 3.6 | 0.54 |  |
| Ar | 5.8 | 0.82 | 0.76 |
|  | 4.7 | 0.70 |  |
|  | 4.8 | 0.72 |  |
| $CO_2$ | 5.5 | 0.82 | 0.83 |
|  | 5.9 | 0.88 |  |
|  | 5.2 | 0.78 |  |
| $NH_3$ | 5.8 | 0.87 | 0.85 |
|  | 5.5 | 0.82 |  |

The theoretical relationship between composite ultimate strength and interface bond strength can be used to deduce the interfacial properties. Using Equation (III) and information on fiber volume fraction, aspect ratio, and experimentally determined ultimate strength, the average bond strength was found to be 0.63 MPa in the composite including non-treated fibers, and 0.76, 0.83, and 0.85 MPa in the composite with Ar, $CO_2$, and $NH_3$ plasma-treated fibers, respectively. These represent bond strength improvements of 21%, 32%, and 35% for the Ar, $CO_2$ and $NH_3$ plasma-treated fibers over the non-treated fiber.

To confirm that the composite properties are improved as a result of fiber/matrix interface bond improvement by the plasma treatment, fiber pull-out tests were conducted by pulling individual fibers out of cement matrix bases.

In contrast to the composites formed for the tensile tests, continuous polyethylene fibers as opposed to discontinuous fibers were utilized in the specimen prepared for use in the pull-out analysis. To treat the continuous fibers, a plasma treatment system manufactured by AIRCO/Plasma Science (Model PS 300) with a large chamber size was used. Only Ar gas was employed, at a flow rate of 40 mL/min, at an initial pressure of 480 mtorr and a power level of 58 watts. Treatment time was maintained at five minutes. To ensure consistent treatment conditions, a precise amount of fibers was treated for each batch. The process of plasma treatment was followed immediately by specimen casting in the same cementitious material utilized for the composite test. The exposure of the treated fiber to air was controlled to be minimal to avoid possible reactions that the air might have to change the surface conditions of the treated fibers.

Figure 3:
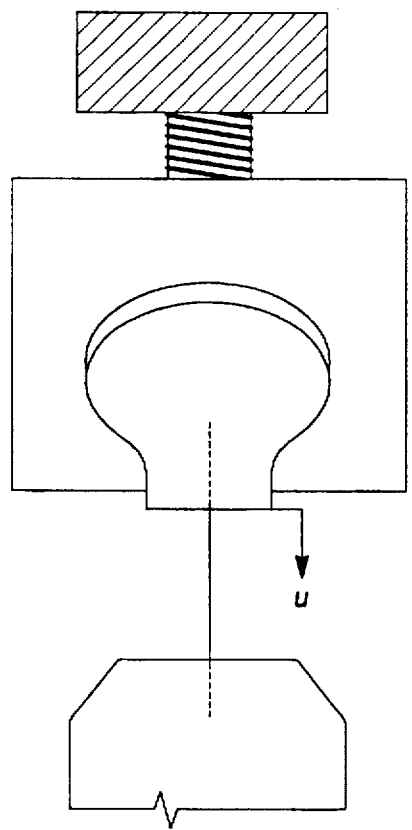
FIG. 3 is a depiction of the apparatus employed to carry out the pull-out analysis described herein.

To conduct the pull-out analysis, a fiber sample is embedded to a length of 12 mm in a specimen as illustrated in FIG. 3. The specimen is held by the loading fixture connected to a load cell. On the other end of the specimen, a hydraulic grip is used to hold the protruding fiber such that no slip may occur between the grip and the fiber. The pull-out test is conducted using a uniaxial hydraulic MTS testing machine which applies a constant displacement rate to the fiber grip. A computer data acquisition system, as is known in the art, is employed to collect data during the tests, including the applied load P obtained from the load cell and the displacement of the fiber grip by measuring the crosshead movement. The displacement of the fiber protruded end u is obtained by subtracting the elastic stretch of the fiber-free length between the matrix base and the fiber grip from the measured crosshead displacement. The elastic stretch of the fiber-free length at any given applied load, in turn, is calculated based on the initial fiber-free length, fiber cross-sectional area, and fiber elastic modulus. In general, the interfacial bond properties are interpreted based on the P-u curves obtained from the pull-out tests.

In the preparation of the test samples, specimens were demolded 24 hours after casting and were cured in a water tank until testing. Fiber pull-out tests were conducted at the age of 28 days, the same age as the composite specimens. The matrix used was identical to that used in the composite tensile specimens described above. Additional tests were carried out using a less dense matrix (Type I portland cement with w/c=0.4, with no fumed silica). Test results were almost the same as for the denser matrix, suggesting that transition zone densification was not effective in improving the bond strength, which is controlled by adhesive failure in this material system.

Figure 2:
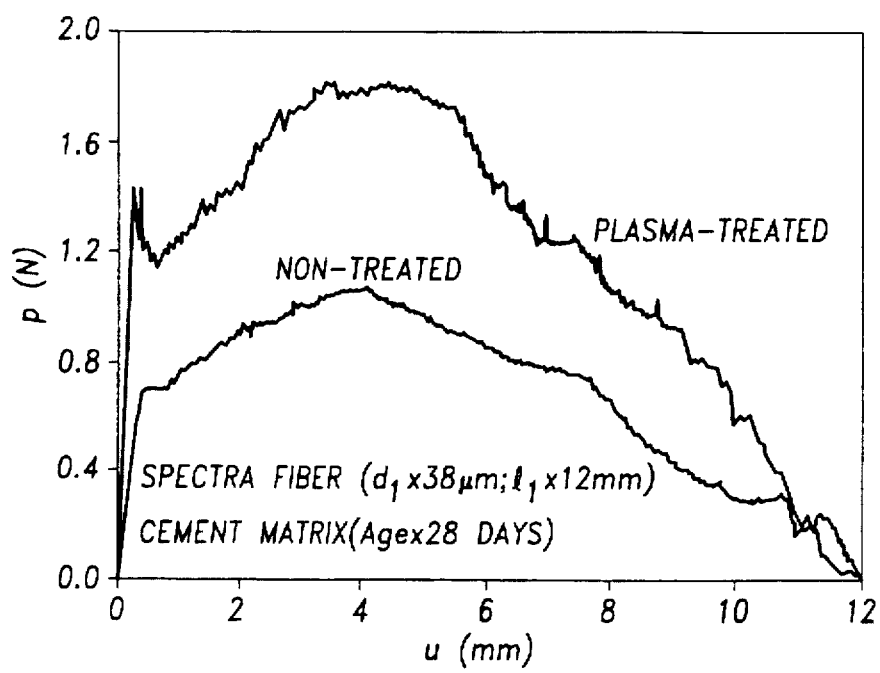
FIG. 2 is a graph illustrating pull-out curves for both plasma-treated polyethylene fibers and untreated polyethylene fibers.

As illustrated in FIG. 2, typical P-u curves from pull-out tests of plasma-treated and non-treated high-modulus polyethylene fibers are shown. Generally, the pull-out curves include a near-linear portion corresponding to the debonding process at the very beginning and a highly nonlinear portion, which covers most of a pull-out curve, representing the pull-out process. The concave-downward shape of the nonlinear branch indicates a slip-hardening behavior of fiber pull-out caused by the abrasion effect. Due to the abrasion effect between the fibers and cement matrix, the fiber surface is damaged and stripped into small fibrils. These small fibrils in turn contribute to the resistance against the fiber from being pulled out. Due to this mechanism, the average frictional bond thus increases with the pull-out distance. In addition to the pull-out curve of plasma-treated fibers, there is a slight load drop following the fully debonded stage. The load drop implies that, in the debonding stage, this particular fiber/cement system has a higher elastic bond strength than the frictional bond, whereas, for the non-treated fiber which does not exhibit such a load drop, the debonding process is basically frictional control.

Comparing the features of the pull-out curves in FIG. 2, it can be seen that the fiber sample with plasma treatment has a much higher frictional bond and consumes significantly more energy during the pull-out process than does the non-treated fiber. The average initial frictional bonds are calculated from the load at full debonding which refers to the onset of the nonlinear branch of a pull-out curve divided by the initial fiber/matrix contact area $\pi d_f l_f$ where $l_f$ and $d_f$ are the fiber embedment length and fiber diameter, respectively. As shown in the figure, the mean of the frictional bond of non-treated high-modulus polyethylene fiber has been enhanced by approximately 100% due to plasma treatment, increasing from 0.54 to 1.02 MPa.

According to the experimental results obtained from both single-fiber pull-out tests and composite tensile tests, plasma treatment of high-modulus polyethylene fibers was found to be effective in improving interface bond properties between fibers and the cementitious material. Due to the increase in surface reactivity, plasma-treated fiber samples exhibit a much higher adhesion to cement material and alters the characteristics of fiber debonding. It is confirmed that enhancement in composite properties, namely, ultimate strength and strain in pseudo strain-hardening cementitious composites, is achievable from interface property modification as a result of plasma treatment of fibers.

Among the three gas types used to carry out the composite tests, it appears that the $NH_3$ plasma, with a 35% improvement in bond strength, provides the most effective treatment. Yet, in comparison to the data obtained from the direct pull-out tests, this bond strength improvement for the treated discontinuous fiber bundle is only a fraction of that for the treated continuous fibers. Several possible sources for this discrepancy in magnitude change in bond strength can be traced. The continuous and discontinuous fibers were treated in different plasma treatment systems, even though conditions of treatment were maintained to be as similar as possible. In particular, the small size of the chamber in the Harrick PDC 3XG model requires the fiber bundles to be packed together more tightly than the continuous fibers. Since the plasma penetration depth is limited, it is possible that the discontinuous fiber bundles were only partially treated, with only those fibers on the surface exposed to and receiving treatment from the plasma gas. These considerations suggest that the composite test results FIGS. 1(b–d) can be further improved, if plasma treatment conditions for the fiber bundles are more carefully controlled as discussed below.

Figure 4:
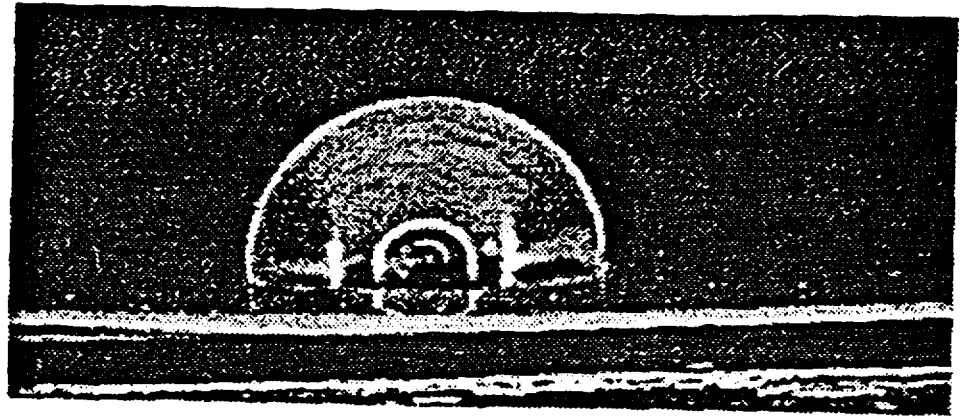
FIG. 4 is a photomicrograph illustrating the change in contact angles for untreated and plasma-treated polyethylene films.
Figure 4:

As illustrated in Table II, under optimum treatment conditions, a six-fold increase in bond strength and seven-fold increase in interface toughness has been achieved. In addition, a significant improvement of surface energy (related to wettability of the fiber) was attained. In general, a high surface energy is associated with low contact angle. Thus, as shown in FIG. 4, the contact angle of a polyethylene film (i.e. fibers) can be dramatically reduced from approximately 90° to about 28° by plasma treating the polyethylene sample.

A comparison of maximum improvements of interfacial property (bond strength and interface toughness) by various plasma treatment conditions is reported in Table II, together with the optimum conditions. It is clearly shown that high power plasma (i.e. a plasma applied at higher wattages) is more effective in modifying the fiber surface which, in turn, leads to improved bond strength with the exception of ammonia plasma. Very high chemical bonds can be achieved with more aggressive gases containing oxygen but this may result in a decrease in interface toughness. Under this category, high power air plasma might be more desirable than oxygen plasma due to its easy access and low cost.

Energy dissipation ability can be another important consideration for composite design, since very high composite toughness might outweigh the strength requirement for some applications. In this regard, high power argon plasma demonstrates the highest improvement in interface toughness as well as high bond strength with a five minute treatment. When the treatment time is increased to ten minutes, a transition from frictional bond to chemical bond takes place, and results in lower energy consumption. Prolonged treatment with ammonia plasma leads to an adverse result at both power levels tested. It is also suggested from the wettability study that the choice of functional group added onto fiber surface be the dominant factor for enhanced interfacial property, whereas wettability might be secondary.

TABLE II

Maximum improvement of interfacial property by various plasma treatments.

| Gas Type | Bond, $\tau/\tau_o$ | Toughness, $T_f/T_{fo}$ | Power Level (watt) | Optimum Time (Min) |
|---|---|---|---|---|
| Argon | 3.5 | 4.9 | 100 | 10 |
|  | 4.5 | 6.9 | 300 | 5 |
| Ammonia | 3.7 | 3.6 | 100 | 1 |
|  | 2.8 | 3.8 | 300 | 1 |
| Oxygen | 4.0 | 5.4 | 100 | 10 |
|  | 6.3 | 1.3 | 300 | 10 |
| Air | 4.0 | 3.8 | 100 | 10 |
|  | 6.0 | 0.7 | 300 | 10 |

In addition to the increases in bond strength and interface toughness which are shown herein, a significant improvement in surface energy (i.e. wettability of the fibers contained in the matrix) of the cementitious matrix has also been noted.

In view of the interface property improvements shown in Table II, it is expected that the corresponding composite properties will also be dramatically improved.

Finally, while the optimal conditions for various excitable gases are generally set forth in Table II, it should be understood by those skilled in the art that some variance in the parameters are considered by the inventors to be within the scope of the present invention. In this regard, it is noted that the pressures at which the reinforcement fibers are treated can range from about 0.1 torr to about 10.0 torr. Further, the excitable gas flow rates typically range from approximately 10 mL/min to 100 mL/min. and the excitation energy level will generally range from 10 to about 300 watts.

Various modifications may be made to the above description relating to embodiments of the invention without departing from the spirit and scope of the invention defined in the accompanying claims.

What is claimed is:

1. A composite material comprising:

plasma treated reinforcement fibers, said fibers being present in a positive amount up to about 5.0% by volume; and a cementitious material which upon curing forms a cement matrix including said reinforcement fibers.

2. The composite material of claim 1, wherein said plasma treated reinforcement fibers are polymeric.

3. The composite material of claim 2, wherein said plasma treated fibrous material is present in an amount of between about 1.0 to about 3.0% of the total volume.

4. The composite material of claim 1, wherein said cementitious material is selected from the group consisting of Portland cement, mortar, and concrete.

5. The composite material of claim 1, wherein said cementitious material includes fumed silica.

6. The composite material of claim 1, wherein said plasma treated reinforcement fibers are selected from the group consisting of continuous fibers, discontinuous fibers, and mesh fibers.

7. A composite material comprising:

plasma treated reinforcing fibers including polar groups, said fibers being present in a positive amount including up to 5.0% by total volume of the composite material; and a cementitious material which upon curing forms a cement matrix with said reinforcement fibers.

8. The composite material of claim 7, wherein said plasma treated reinforcement fibers are polymeric.

9. The composite material of claim 7, wherein said plasma treated fibrous material is present in an amount of between about 1.0 to about 3.0% of the total volume.

10. The composite material of claim 7, wherein said cementitious material is selected from the group consisting of Portland cement, mortar, and concrete.

11. The composite material of claim 7, wherein said cementitious material includes fumed silica.

12. The composite material of claim 7, wherein said plasma treated reinforcement fibers are selected from the group consisting of continuous fibers, discontinuous fibers, and mesh fibers.

* * * * *